(12) United States Patent
Golcher et al.

(10) Patent No.: US 11,311,352 B2
(45) Date of Patent: Apr. 26, 2022

(54) ORTHODONTIC BRACKET AND AN ORTHODONTIC APPLIANCE

(71) Applicant: 3M INNOVATIVE PROPERTIES COMPANY, St. Paul, MN (US)

(72) Inventors: Andre Golcher, Lübbecke (DE); Ralf M. Paehl, Melle (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 95 days.

(21) Appl. No.: 16/651,412

(22) PCT Filed: Sep. 19, 2018

(86) PCT No.: PCT/IB2018/057231
§ 371 (c)(1),
(2) Date: Mar. 27, 2020

(87) PCT Pub. No.: WO2019/064127
PCT Pub. Date: Apr. 4, 2019

(65) Prior Publication Data
US 2020/0289240 A1    Sep. 17, 2020

(30) Foreign Application Priority Data
Sep. 28, 2017  (EP) .................................. 17193625

(51) Int. Cl.
*A61C 7/28* (2006.01)
*A61C 7/14* (2006.01)

(52) U.S. Cl.
CPC ............... *A61C 7/28* (2013.01); *A61C 7/145* (2013.01); *A61C 7/148* (2013.01)

(58) Field of Classification Search
CPC ............ A61C 7/28; A61C 7/145; A61C 7/148
See application file for complete search history.

(56) References Cited

U.S. PATENT DOCUMENTS 1,467,789 A  *  9/1923  Griffin ...................... A61C 7/12
                                                       433/14
2,236,042 A  *  3/1941  Terwilliger ............... A61C 7/12
                                                       433/14
(Continued)

FOREIGN PATENT DOCUMENTS

CH    701510    1/2011
EP    3461454   4/2019
(Continued)

OTHER PUBLICATIONS

1507 Extended EP Search Report for EP17193625.5, dated Feb. 14, 2018, 6pages.

(Continued)

*Primary Examiner* — Ralph A Lewis
(74) *Attorney, Agent, or Firm* — 3M IPC (57) ABSTRACT

An orthodontic bracket that forms a slot for receiving an archwire. The slot extends through the orthodontic bracket along an archwire axis. The slot is delimited in directions radially of the archwire axis by a slot base surface, an opposite slot cover surface and two opposite slot side surfaces. Further, the slot has an open side that is provided by a gap within one of the slot side surfaces in a dimension along the archwire axis.

14 Claims, 5 Drawing Sheets

(56) References Cited

U.S. PATENT DOCUMENTS

| | | | | | |
|---|---|---|---|---|---|
| 3,486,231 | A | * | 12/1969 | Nelson | A61C 7/282 433/13 |
| 5,762,492 | A | * | 6/1998 | Kanomi | A61C 7/12 433/14 |
| 7,033,170 | B2 | * | 4/2006 | Cordato | A61C 7/14 433/10 |
| 7,481,651 | B2 | * | 1/2009 | Sernetz | A61C 7/282 433/10 |
| 2012/0015315 | A1 | | 1/2012 | Wiechmann | |
| 2013/0252194 | A1 | * | 9/2013 | Hagelganz | A61C 7/28 433/9 |
| 2016/0235502 | A1 | * | 8/2016 | Hagelganz | A61C 7/303 |
| 2018/0325629 | A1 | * | 11/2018 | Cursio | A61C 7/16 |
| 2019/0090987 | A1 | * | 3/2019 | Hung | A61C 7/28 |

FOREIGN PATENT DOCUMENTS

| | | |
|---|---|---|
| WO | WO 2010-014518 | 2/2010 |
| WO | WO 2017-109716 | 6/2017 |
| WO | WO 2017-132080 | 8/2017 |

OTHER PUBLICATIONS

International Search Report for PCT International Application No. PCT/IB2018/057231, dated Nov. 21, 2018, 5 pages.

* cited by examiner

ORTHODONTIC BRACKET AND AN ORTHODONTIC APPLIANCE

FIELD OF THE INVENTION

The invention relates to an orthodontic bracket, and in particular to an orthodontic bracket with a slot for receiving an archwire. The slot is delimited in all four directions radially of the archwire axis.

BACKGROUND ART

Orthodontic brackets are used in orthodontic treatments for moving teeth from an initial position to a desired position in a patient's dentition. The initial position typically refers to a position at the beginning of an orthodontic treatment, for example a position in which the labial surfaces of the teeth are misaligned to each other, whereas in the desired position the labial surfaces of the same teeth are typically generally aligned.

For example, the patient's teeth may be aligned relative to each other to provide the dentition with a more aesthetically pleasant appearance. Further, one or more teeth may be moved within the dentition to compensate for a malocclusion. Such a movement of a tooth or teeth can be typically achieved by using orthodontic brackets attached to the teeth. The orthodontic brackets are typically connected to an elastic orthodontic archwire for applying forces that urge the teeth toward desired positions over a longer term. The orthodontic archwire is typically secured within a slot that is provided in each of the orthodontic brackets by an orthodontic ligature. The orthodontic ligature is typically formed by an elastic band that is stretched over the orthodontic bracket to urge the orthodontic archwire into the slot. Several orthodontic brackets connected to the archwire are typically referred to as orthodontic appliance in the field of orthodontics.

Often orthodontic brackets are off-the-shelf products which are configured for use with clinical situations of different patients. Further there are customized orthodontic brackets which are typically made to fit with an individual clinical situation of one particular patient.

For example US 2012/0015315 A1 (Wiechmann et al.) discloses a customized orthodontic bracket system which includes a orthodontic bracket having a customized orthodontic bracket bonding pad for bonding the orthodontic bracket to a tooth of a patient and a orthodontic bracket slot adapted to receive a customized archwire. The customized archwire is adapted to be positioned in the orthodontic bracket slot to form a precise orthodontic bracket slot-archwire interface.

There is a desire that an orthodontic appliance is capable of controlling the movement of each tooth in three dimensions including twisting about these three dimensions. In orthodontics the three dimensions are typically based on a three-dimensional Cartesian coordinate system individually defined for each tooth. Further, the dimensions of the twisting about these axes are typically referred to as "torque", "rotation" and "angulation". Typically the term "torque" refers to twisting the tooth about the mesial-distal tooth axis, which is defined in a dimension tangential of a neutral line along which the dental arch extends. The term "rotation" typically refers to a twisting about the tooth axis (or coronal-apical tooth axis), which is defined in a dimension between the root and the occlusal or incisal side of the tooth. The tooth axis is typically or is desired to be approximately vertical according to a parallel to the anatomical vertical body axis. Further, the term "angulation" typically refers to a twisting the tooth about the vestibular-lingual tooth axis, which is defined in a dimension between the cheek or lip and the tongue. The tooth axis, the mesial-distal tooth axis and the vestibular-lingual tooth axis typically meet in approximately a center of the tooth.

Although a variety of different orthodontic brackets and orthodontic bracket systems are on the market there is still a desire to provide a orthodontic bracket system which is maximized with respect to its capability of controlling the movement in different dimensions and orientations.

SUMMARY OF THE INVENTION

The invention relates to an orthodontic bracket. The orthodontic bracket forms a slot for receiving an archwire. The slot extends through the orthodontic bracket along an archwire axis. The slot is delimited in directions radially of the archwire axis by a slot base surface and an opposite slot cover surface and two opposite slot side surfaces. The slot has an open side that is provided a gap between one of the slot side surfaces and the slot cover surface.

The invention is advantageous in that it provides an orthodontic bracket and appliance that provides for maximized torque, rotation and torque control during the movement of a patients tooth or teeth. Although a common orthodontic ligature can secure an orthodontic archwire within the slot of an orthodontic bracket, it has been found that forces exerted by the archwire in a direction in which the slot is open may in some instances exceed a force at which the orthodontic ligature can urge the archwire into the slot. In such cases the orthodontic archwire loses a bit of its tension and cannot exert the full desired force to the orthodontic bracket anymore. Hence, in the orthodontic brackets of the prior art the control of the tooth movement may be affected in one of the vestibular-lingual tooth axis, the coronal-apical tooth or in the mesial-distal tooth axis, depending on where the slot opening is oriented to. The orthodontic bracket and appliance of the invention provides for maximized control of the movement in the vestibular-lingual tooth axis, the coronal-apical tooth and even in the mesial-distal tooth axis. Further, the orthodontic bracket and appliance is capable of providing the control of the twisting about all three axes and the movement along all three axes simultaneously. This helps minimizing the treatment time because any additional or enhanced treatment for twisting or moving one or more teeth in some particular situations may be saved.

According to the invention the slot is preferably formed by four surfaces, a slot base surface, the slot cover surface and the two opposite slot side surfaces. These four surfaces are preferably oriented in different directions toward the archwire axis. This means that each of the four surfaces preferably faces the archwire axis. Such different directions preferably refer to a vector that is perpendicular on the respective surface in a direction toward the archwire axis. Preferably these vectors are arranged in a common plane that is transverse or perpendicular to the archwire axis. The four surfaces may be planar and one dimension of the plane may be oriented parallel to the archwire axis.

The term "extending through" as referred to herein means that the slot particularly extends entirely through the orthodontic bracket. This means that the slot is preferably open toward both directions along the archwire axis.

The archwire axis typically corresponds to a parallel or an essential parallel of the mesial-distal tooth axis of a tooth that is associated with the orthodontic bracket. The archwire axis may further be parallel or essentially parallel to a tooth facing surface of the orthodontic bracket. The tooth facing surface of the orthodontic bracket is used for bonding the orthodontic bracket to a patient's tooth.

In one embodiment the slot base surface and the two slot side surfaces are planar. The two slot side surfaces are preferably parallel relative to each other. Further, the two slot side surfaces are perpendicular to the slot base surface. Thus, the slot base surface and the two slot side surfaces are configured for engaging with a rectangular archwire that is sized to snugly fit between the two side surfaces. The slot cover surface may be planar and parallel to the slot base surface. However, the slot cover surface may have a different shape as appropriate.

In one embodiment the slot is L-shaped in a plane perpendicular to the archwire axis. The slot may particularly have an L-shaped profile at which the slot extends along the archwire axis. Further at least a projection of the profile of the slot on a plane perpendicular to the archwire axis may be L-shaped. Thereby the slot base surface and the two slot side faces may form the horizontal portion of the L-shape and the slot cover surface may belong to the vertical portion of the L-shape. In this regard it is noted that the terms "horizontal" and "vertical" refer to the letter "L" as referred to in the definition "L-shape".

In one embodiment the gap has a gap width in the vestibular-lingual tooth dimension perpendicular to the archwire axis. Further, the slot has a slot width between the slot base surface and the slot cover surface in the same vestibular-lingual tooth dimension. Thus, the gap width and the slot width extend parallel to each other. The slot width is preferably twice of the gap width or smaller. Accordingly, an archwire exhibiting an archwire width that fits through the gap can be displaced toward the slot base surface so that a space is provided between the cover surface and the archwire. That space can be filled by a orthodontic ligature to hinder the archwire from displacing away from the slot base surface. Accordingly any movement of the archwire toward escaping from the slot causes the orthodontic ligature to be compressed. This is in contrast to the prior art in which the orthodontic ligature is typically stretched. Further, the gap preferably entirely separates the slot side surface and the slot cover surface from each other. Thus, the open slot is provided.

In one embodiment the orthodontic bracket is configured for bonding on a patient's tooth. Preferably the orthodontic bracket forms a tooth facing surface for bonding the orthodontic bracket to a patient's tooth. The tooth facing surface may have a shape that is customized with respect to the shape of the patient's tooth. The orthodontic bracket preferably has a tooth facing surface that has a shape conforming to a portion of an outer tooth surface (for example a portion of a labial or lingual tooth surface) of a patient's tooth. For example, the tooth facing surface may have a shape that corresponds to the negative shape a portion of a patient's tooth. The tooth facing surface may exhibit a bonding structure, for example a grid or mesh structure. Such a bonding structure may help maximizing the bonding strength between an adhesive used for bonding the orthodontic bracket to the tooth and the tooth facing surface. It is noted that although the tooth facing surface may have the bonding structure the tooth facing surface still can have an overall shape in accordance to an outer tooth surface portion.

In one embodiment the orthodontic bracket is a lingual orthodontic bracket. The lingual orthodontic bracket preferably has a tooth facing surface that has a shape conforming to a portion of a lingual surface of a patient's tooth.

In one embodiment the orthodontic bracket has a base portion forming the tooth facing surface and a cap portion. The cap portion preferably forms an end surface of the orthodontic bracket on an opposite side of the tooth facing surface. The orthodontic bracket further preferably has an intermediate portion connecting the cap portion and the base portion. The orthodontic bracket further preferably has a constriction. Preferably the intermediate portion forms the constriction for retaining an orthodontic ligature therein.

In one embodiment the cap of the orthodontic bracket exhibits a ball-shaped outer surface. The ball-shaped surface may for example have a semi-spherical or partial spherical shape. Thus, the orthodontic bracket is relatively tissue friendly. This means that the outer surface of the cap, which is typically oriented to a patient's tissue (for example the tongue, cheeks or lips), is relatively smooth and particularly does not have any exposed sharp edges or corners.

In a further aspect the invention relates to an orthodontic appliance. The orthodontic appliance comprises an orthodontic bracket according to the invention and an orthodontic archwire. The orthodontic archwire is prepared for running through the slot of the orthodontic bracket.

In one embodiment the orthodontic archwire is running through the slot of the orthodontic bracket. The orthodontic archwire preferably extends at a rectangular cross-section. Thus the orthodontic archwire installed in the orthodontic appliance is capable of controlling the angulation (=twisting about the mesial-distal axis) of a tooth during an orthodontic treatment. The skilled person will however recognize orthodontic archwires having different cross-sections may be used, in case angulation control is not desired or of low importance. For example, a round archwire (having a circular or oval cross-section) may be used with the appliance of the invention. The orthodontic archwire may be made of superelastic material like NiTi or stainless steel or titanium.

In a further embodiment the orthodontic appliance may comprise a plurality of differently shaped archwires. The different shapes account for the tooth movement during the orthodontic treatment. For example a first archwire may generally follow the shape of the lingual or labial tooth surfaces of a patient's dentition at the beginning of the treatment and the further archwires may more and more conform to the shape of the lingual or labial tooth surfaces of the patient's dentition at the end of the treatment.

In one embodiment the orthodontic appliance further comprises an orthodontic ligature. Preferably at least a portion of the orthodontic ligature is arranged within the slot between the orthodontic archwire and the cover surface. Thus the orthodontic ligature traps the orthodontic archwire between the two slot side surfaces, the slot base surface and the at least portion of the orthodontic ligature. The orthodontic ligature may fill the whole space between the archwire and the slot cover surface.

In one embodiment the orthodontic ligature is retained at the orthodontic bracket. Thereby the portion of the orthodontic ligature is preferably locked within the slot.

In a further embodiment the orthodontic ligature has a retention structure for engaging with a retention structure at the orthodontic bracket. Alternatively or additionally the orthodontic ligature may have a retention structure for engaging with the archwire.

The orthodontic ligature may fill any free space in the slot completely or only partially. This enables to control the level of control of the tooth movement and allows to minimize friction forces that occur between the archwire and the orthodontic bracket. Toward the end of the treatment the orthodontic ligature may even be oversized with respect to the free space in the slot so as to press the orthodontic archwire into the slot. This is to make sure the wire is fully engaged into the slot. The orthodontic ligature may be made from a material selected from materials of a different hardness. The orthodontic ligature may be made from very soft materials like (for example silicon), medium hardness (for example plastic) or hard materials (for example steel or superelastic metals). It is notes that the categories "very soft", "medium hardness" and "hard" as referred to herein are selected in the context of the present specification only.

In one embodiment the orthodontic appliance comprises a plurality of orthodontic brackets according to the invention and an orthodontic ligature for each of the orthodontic brackets. The orthodontic appliance may further comprise at least one orthodontic bracket that is different from the orthodontic bracket of the invention.

The orthodontic bracket as referred to herein may be designed in accordance to the following method. The method may comprise the step of capturing the shape of a patient's teeth. The capturing of the shape of the patient's teeth may be performed by directly scanning the patient's teeth using an optical intra-oral scanner, or by scanning a plaster model of the patient's teeth. The step of capturing the shape of the patient's teeth preferably provides the shape in the form of a virtual model of the patient's teeth. The virtual model is data based and suitable for use in a Computer Aided Design (CAD) system.

The method may further comprise the step of defining an archwire axis relative to the virtual model of the patient's teeth. This may be performed based on the so-called straight wire approach according to which the archwire axis is created within one common plane that is generally parallel to the occlusal plane of the patient's teeth. It is noted that the straight wire approach is not limited to a planar archwire but allows the archwire to deviate from that plane as required. Nevertheless the common plane is typically used as a reference in the straight wire approach. Further the archwire axis may be defined at a distance from the labial or lingual side of the patient's teeth. The distance may be predetermined and/or adjustable and accounts for a space needed for the orthodontic bracket to be placed on the patient's tooth.

The method may further comprise the step of determining an area on a virtual tooth represented in the virtual model of the patient's teeth at which the orthodontic bracket is to be bonded. This may be performed by computer aided drawing a line indicating the periphery of that area on the virtual tooth. Such a line may correspond to a circle, for example of a predetermined size, or to a free shape determined by an operator of the CAD system. Other shapes are possible. The indicated area may be used (for example copied) to create a virtual model of the tooth facing side of the orthodontic bracket. This step may be repeated for each tooth for which a orthodontic bracket is to be designed.

Based on the tooth facing surface the overall orthodontic bracket shape may be designed by computer aid. The the slot may be automatically virtually cut out of the overall orthodontic bracket shape along the archwire axis.

The so formed virtual design of the orthodontic brackets may be used in a manufacturing machine which machines physical orthodontic brackets and/or physical models of the orthodontic brackets. The orthodontic brackets may for example be manufactured (for example from metal, like gold or stainless steel, or ceramics) directly by Selective Laser Melting (SLM) or Selective Laser Sintering (SLS). Further, the orthodontic brackets may be manufactured by Stereolithograpy (SLA), Fused Deposition Modeling (FDM) or any other appropriate additive manufacturing process.

Alternatively the physical models of the orthodontic brackets may be build up from a meltable material, like wax, as a core for making a casting mold. The casting mold may then be used to cast the orthodontic bracket from ceramic or metal.

The physical orthodontic brackets may further be manufactured from a set of standardized orthodontic bracket blanks made by manufacturing processes like Metal Injection Molding (MIM), casting, CNC machining, for example. These blanks may be individualized by CNC milling or grinding utilizing digital design data.

DETAILED DESCRIPTION OF THE INVENTION

Figure 1:
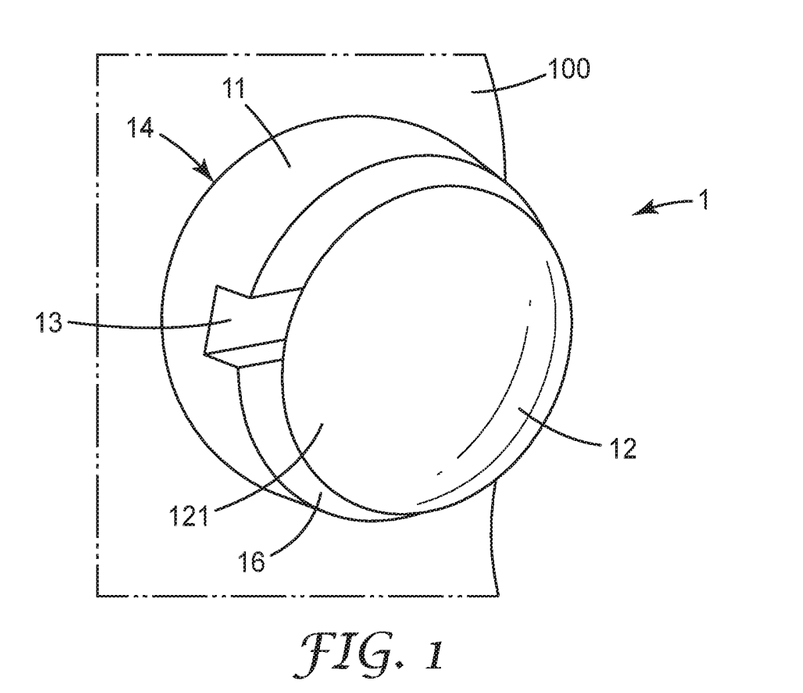
FIG. 1 is a perspective view of an orthodontic bracket according to an embodiment of the invention.

FIG. 1 shows an exemplary orthodontic bracket 1 according to the invention. The orthodontic bracket 1 is arranged or bonded on a patient's tooth 100. The tooth 100 in the example is a molar. The orthodontic bracket 1 has a base portion 11 which comprises a slot 13 for receiving an archwire (not illustrated in this view) and a tooth facing surface 14 (not visible from the illustrated perspective). In the example the orthodontic bracket 1 is customized to the patient's tooth. In particular the tooth facing surface 14 corresponds in shape to the negative outer shape of the portion of the patient's tooth 100 on which the orthodontic bracket 1 is arranged. The area defined within the peripheral shape of the tooth facing surface is also referred to as "footprint herein". The customized orthodontic bracket 1 is particularly suitable for a so-called lingual treatment in which the orthodontic brackets are arranged on the lingual side of the patient's teeth, although a labial treatment is possible too. The skilled person will further recognize that in another example an orthodontic bracket may have a base portion with a standardized (for example flat) shape for bonding to any desired tooth as appropriate. In this case the difference in the shape between the orthodontic bracket and the tooth may be compensated by an adhesive used for bonding the orthodontic bracket to the tooth.

The customization of the orthodontic bracket 1 may further concern the footprint of the orthodontic bracket 1 and the related shape of the base portion. Although in the example the footprint is circular other shapes are possible depending on the space available for arranging the orthodontic bracket on the desired tooth. According to the invention, it is however preferred to use a standardized footprint in combination with a customized shape of the tooth facing surface (at least for those teeth that provide sufficient space for such orthodontic brackets). This facilitates the orthodontic bracket design and provides for a particular aesthetic appearance of a set of orthodontic brackets arranged on a patient's teeth. In the example the orthodontic bracket 1 has an overall ball-shaped configuration.

The orthodontic bracket 100 further has a cap portion 12. The cap portion 12 covers the slot 13. The cap portion 12 further forms a tissue facing surface 121 that is oriented away from the tooth facing surface. The tissue facing surface 121 of a lingual orthodontic bracket may for example face the patient's tongue, whereas the tissue facing surface of a labial orthodontic bracket may face the patient's cheek or lips. The tissue facing surface 12 in the example is ball-shaped. Accordingly, the patient's tissue (for example the tongue) being in contact with the orthodontic bracket 1 is in contact with a smooth surface. Thus, the patient comfort can be maximized. Further, due to the cap portion 12 covering the slot the patient's tissue is hindered in directly contacting the slot 13 and any edges or corners of structures forming the slot 13.

Figure 2:
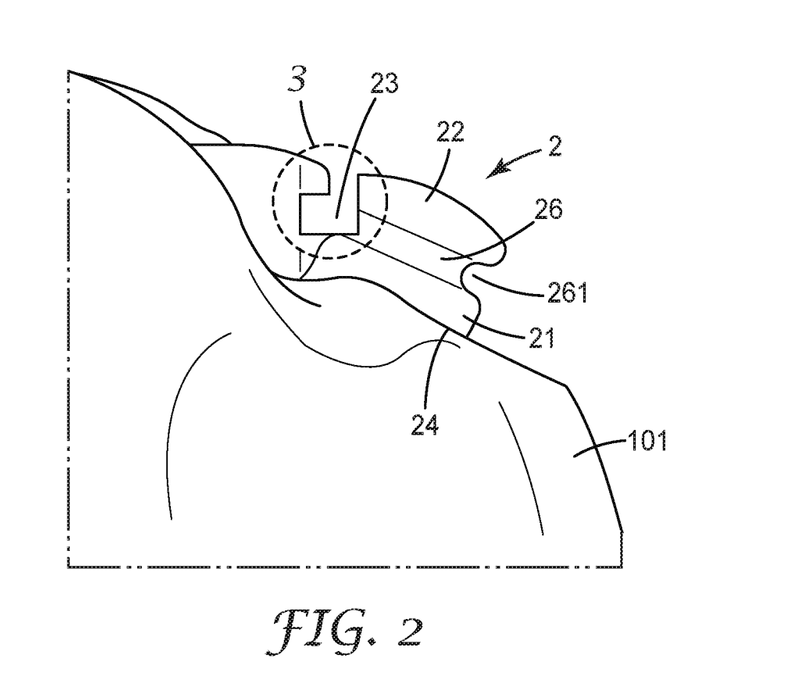
FIG. 2 is a side view of a further orthodontic bracket according to an embodiment of the invention.

FIG. 2 shows a further exemplary orthodontic bracket 2 according to the invention. The orthodontic bracket 2 is arranged on a patient's tooth 101. In the example the tooth 101 is a front tooth. The configuration of the orthodontic bracket 2 essence corresponds to the configuration of the orthodontic bracket 1 shown in FIG. 1. In particular, the orthodontic bracket 2 has a base portion 21 and a cap portion 22. The cap portion 22 covers the slot 23. The cap portion 22 and the base portion 21 are connected via an intermediate portion 26. The intermediate portion 26 forms a constriction 261 with respect to the cap portion 22 and the base portion 21. The constriction 261 allows for retaining a orthodontic ligature (not shown in this Figure) therein. Accordingly, the orthodontic bracket 1 of FIG. 1 and the orthodontic bracket 2 have the base portion 11/21, the cap portion 12/22, and the intermediate portion 16/26 in common, although these portions may have different shapes. The orthodontic bracket 1 of FIG. 1 and the orthodontic bracket 2 differ in that the orientation of the slot 23 and the tooth facing surface 24 is different from the orientation of the slot 13 and the tooth facing surface 14 in FIG. 1. The adapted (reduced) footprint relative to the footprint of the orthodontic bracket 1 is to account for the limited space provided by the front tooth 101 for arranging the orthodontic bracket 2 thereon. Further, the adapted orientation of the slot 23 relative to the orientation of the slot 13 the orthodontic bracket 1 accounts for the inclination of the front tooth 101.

Figure 3:
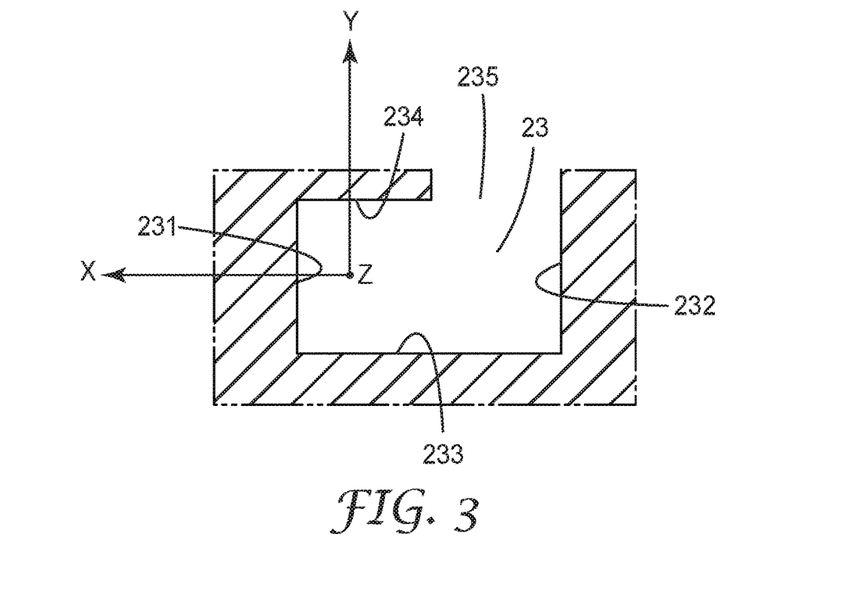
FIG. 3 is a partial view of the orthodontic bracket shown in FIG. 2.

FIG. 3 shows a portion of the orthodontic bracket 2 that forms the slot 23. The slot 23 is delimited by a slot base surface 231 and an opposite slot cover surface 232 and two opposite slot side surfaces 234, 233. Therefore the slot 23 is delimited in four directions in a two-dimensional Cartesian coordinate system as indicated by a vestibular-lingual tooth axis X and a tooth axis Y. An archwire (not shown in this Figure) may run through the slot 23 in an archwire axis Z that is perpendicular to the vestibular-lingual tooth axis X and the tooth axis Y (or perpendicular to the plane of the Figure). The archwire axis runs essentially parallel to the mesial-distal tooth axes of a patient's teeth on which the orthodontic brackets are installed. An archwire inserted in the slot 23 preferably runs through the slot 23 in a dimension along the archwire axis Z.

Figure 4:
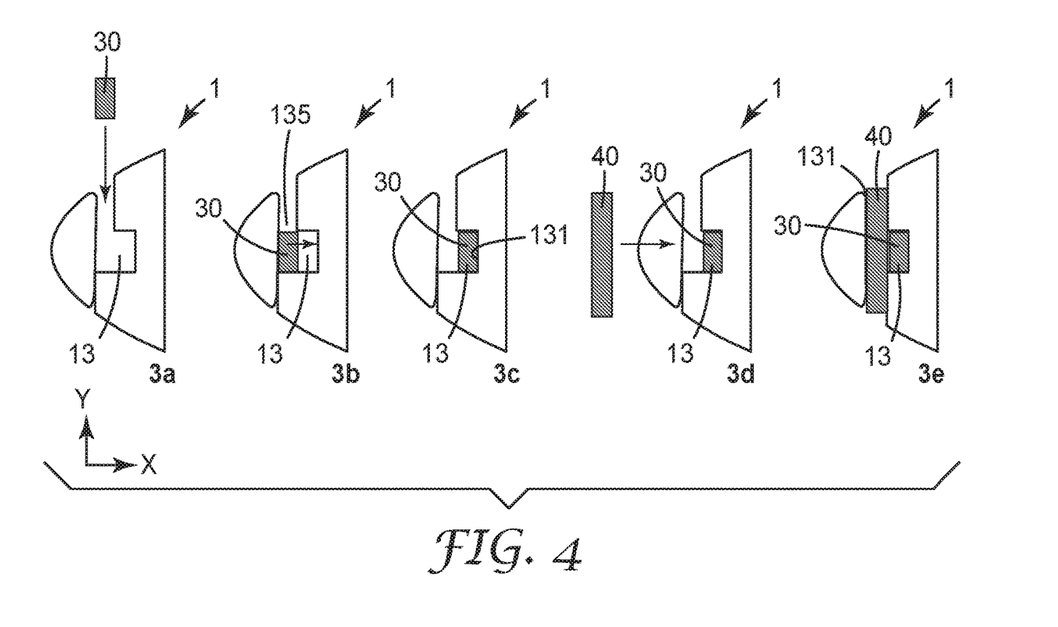
FIG. 4 illustrates the mounting of an archwire into the orthodontic bracket shown in FIG. 1.

The slot 23 has an open side that is provided by a gap 235. The open side provides an "entrance" for the archwire, meaning that after bonding of the orthodontic bracket 2 on a tooth the archwire can be inserted into the slot 23 through the open side. The gap 235 is provided within the slot side surface 234. Further the gap 235 extends along a dimension of the archwire axis Z. Hence, the slot 23 is an open slot allowing the archwire to be inserted in the slot by a movement of the archwire transverse to the archwire axis as illustrated in FIG. 4. This is in contrast to an insertion of an archwire into a so-called orthodontic tube which requires the archwire to be mounted by axially moving the archwire through a hole provided by the tube. Therefore although the orthodontic brackets 1, 2 of the invention provide some of the advantages of an orthodontic tube with respect to controllability of tooth movement, the orthodontic brackets 1, 2 in addition enable the mounting of the archwire in two, three or more of such orthodontic brackets 1, 2 in a patient's mouth. Therefore the orthodontic brackets of the invention can be used on several or all teeth of a patient's dentition (which is generally not possible with orthodontic tubes).

FIG. 4 illustrates an orthodontic bracket 1 at five different stages of use. The orthodontic bracket 1 corresponds to the orthodontic bracket 1 shown in FIG. 1. At the stage 3a the orthodontic bracket 1 is shown in a side view. A cross-section of an archwire 30 is shown outside the slot 13 of the orthodontic bracket 1. At the stage 3b the archwire 30 is placed into the slot 13 through the gap 135. At the stage 3c the archwire 30 is displaced toward the slot base surface 131. As shown at stage 3d an orthodontic ligature 40 (as further described below) is provided. At the stage 3e the orthodontic ligature 40 is placed within the slot 13. The orthodontic ligature 40 fills a space between the archwire 30 and the slot cover surface 132. Thus, the archwire 30 is non-movably restrained between the slot base surface 131 and the slot cover surface 132 via the orthodontic ligature 40. Further the archwire 30 is also non-movably restrained between the slot side surfaces 133, 134. Therefore after the mounting of the orthodontic ligature 40 in the slot 13 the archwire 30 has no freedom to displace in directions of the vestibular-lingual tooth axis X and the tooth axis Y, and the archwire 30 has no freedom to rotate within the slot 13 about any of the vestibular-lingual tooth axis X, the tooth axis Y and/or the archwire axis Z. This provides full control of torques that can be exerted on the orthodontic bracket 1 via the archwire 30 about all three axes X, Y and Z. Further, this provides full control of forces that can be exerted on the orthodontic bracket 1 at least in the vestibular-lingual tooth axis X and the tooth axis Y. It is noted that in the orthodontic bracket of the invention the orthodontic ligature 40 can exert a force on the archwire by a compressive load on the orthodontic ligature, whereas in the prior art the orthodontic ligature is put under tensile load. It has been found that the maximum compressive load is significantly higher than the maximum tensile load for the same orthodontic ligature.

For example, while the orthodontic ligature may withstand a certain pressure force without significantly deforming or breaking the same force acting as tensile force typically would results is the orthodontic ligature to stretch or break.

It is further noted that the type and material of the orthodontic ligature may be selected to provide a certain freedom for the archwire to move. Such movement is however limited by the orthodontic ligature which compresses and finally stops the orthodontic archwire from escaping from the slot. Such a freedom to move for the archwire may for example provided to account for certain clinical situations in the orthodontic treatment. Under certain circumstances the orthodontic bracket of the invention may further be used with an archwire having a reduced cross-section. For example at the beginning of an orthodontic treatment a relatively thin archwire may be used that forms a play within the slot. Although such an archwire has some freedom to displace and to rotate (which in this case is desired), the archwire is still trapped within the slot of the orthodontic bracket. Further, orthodontic brackets of the prior art that use conventional slots and orthodontic ligatures typically always clamp even archwires of a reduced cross-section, so that the orthodontic bracket enables a play between the slot and the archwire. This helps maximizing the patient comfort during the beginning of the treatment and facilitates the treatment of difficult tooth situations. In addition this helps to minimize friction between the archwire and the orthodontic brackets, which is favorable especially for the first phases of a treatment, when crowded teeth need to slide along the archwire to unravel.

Figure 5:
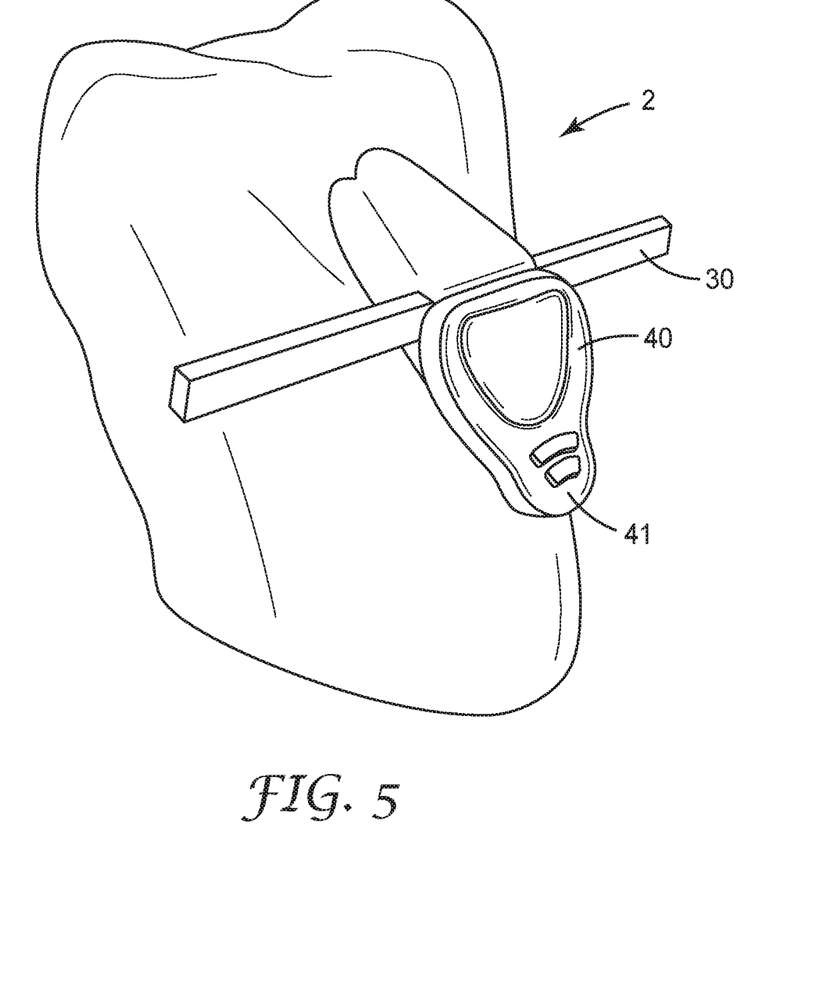
FIG. 5 is a perspective view of an orthodontic bracket mounted with an archwire and a orthodontic ligature according to an embodiment of the invention.
Figure 6:
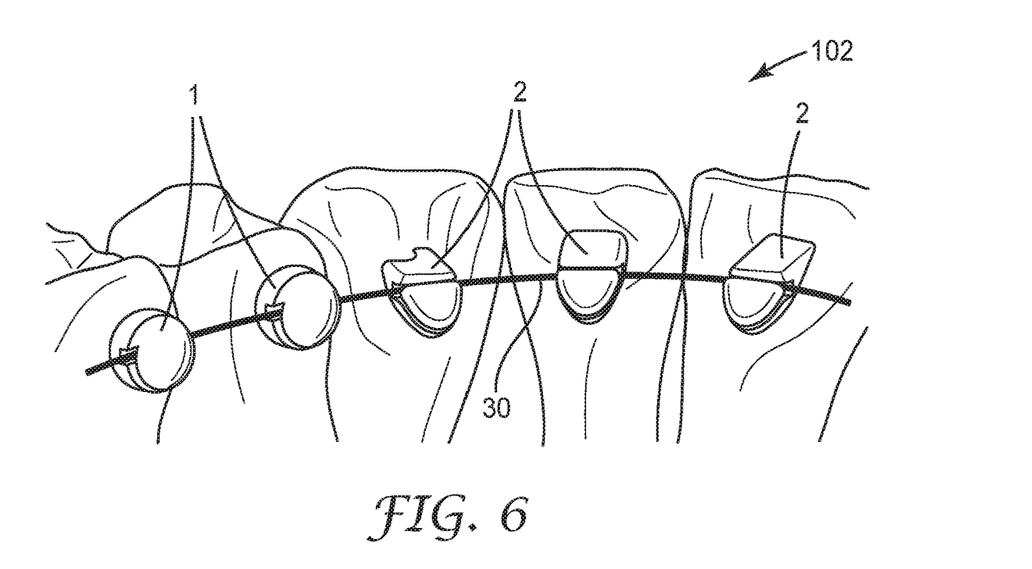
FIG. 6 is a perspective view of a part of an orthodontic appliance according to an embodiment of the invention.
Figure 7:
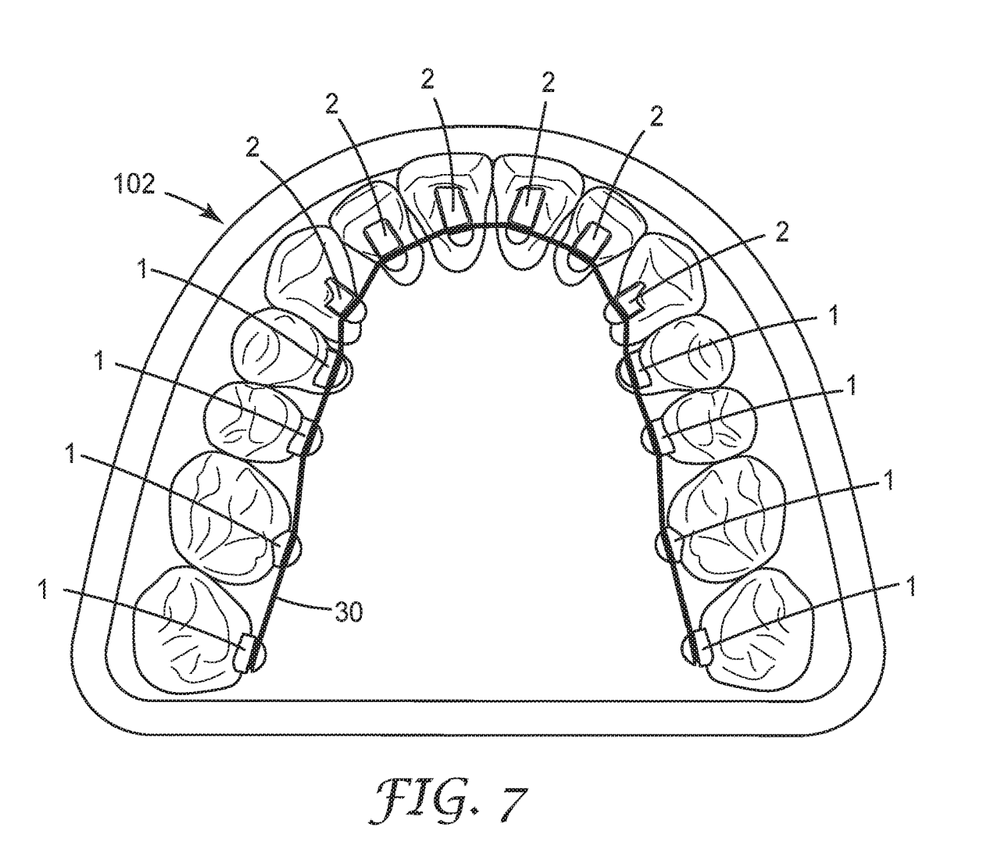
FIG. 7 is a top view of an orthodontic appliance according to an embodiment of the invention.

FIG. 5 shows the orthodontic bracket 2 with the archwire 30 and the orthodontic ligature 40 assembled to form an orthodontic appliance. In the example the orthodontic ligature 40 is an elastic band a portion of which extending through the slot (not visible) and thus locking the archwire 30 in place. The orthodontic ligature 40 in the example has a grip portion 41. The grip portion 41 allows orthodontist, for example, to handle the orthodontic ligature 40, in particular to place the orthodontic ligature 40 in the slot and to retain the orthodontic ligature in the constriction. The grip portion 41 is optional, although it provides the mentioned advantages if present. Multiple orthodontic brackets 1, 2 connected via the archwire 30 are typically arranged on a patient's teeth 102 as illustrated in FIGS. 6 and 7.

Figure 8:
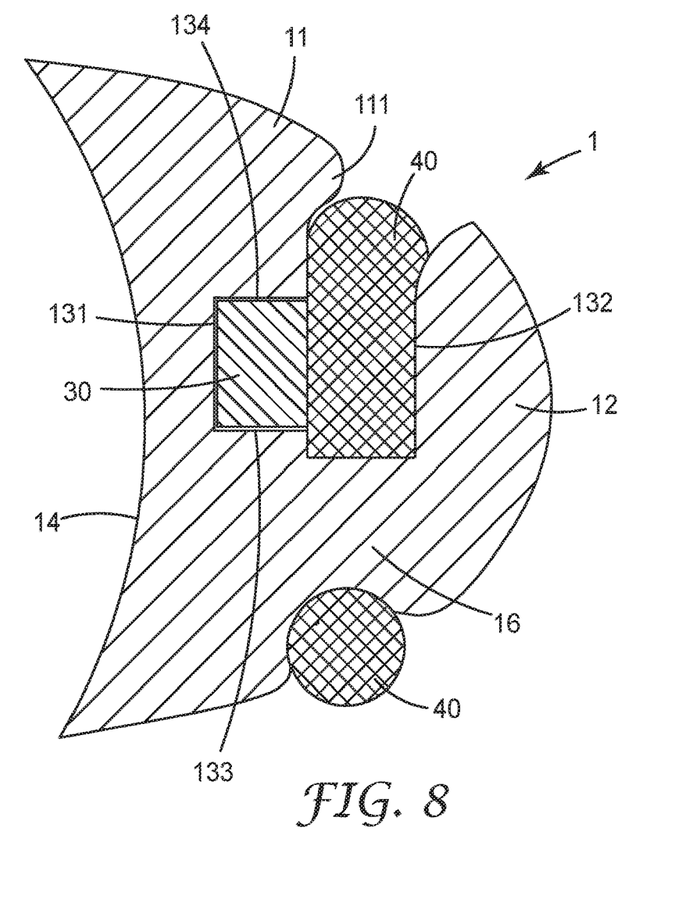
FIG. 8 is a cross-sectional view of an orthodontic bracket according to an embodiment of the invention.

FIG. 8 shows a further exemplary orthodontic bracket 1 according to the invention. The orthodontic bracket 1 is configured for bonding on a molar. The orthodontic bracket 1 has a base portion 11 that forms a tooth facing surface 14, and a cap portion 12 forming an opposite tissue facing surface 121 that is oriented away from the tooth facing surface 14. The cap portion 12 covers the slot 13. The slot 13 has a slot base surface 131 and an opposite slot cover surface 132 as well as two opposing slot side surfaces 133, 134. As shown, none of the two slot side surfaces 133, 134 extend to the slot cover surface 132. In particular the two slot side surfaces 133, 134 do not need to extend beyond the archwire 30 as long as they extend long enough to guide the archwire. The orthodontic bracket 1 further has a retention structure 111 that holds the orthodontic ligature 40 in place. Such a retention structure may be present in any embodiment of the invention.

Figure 9:
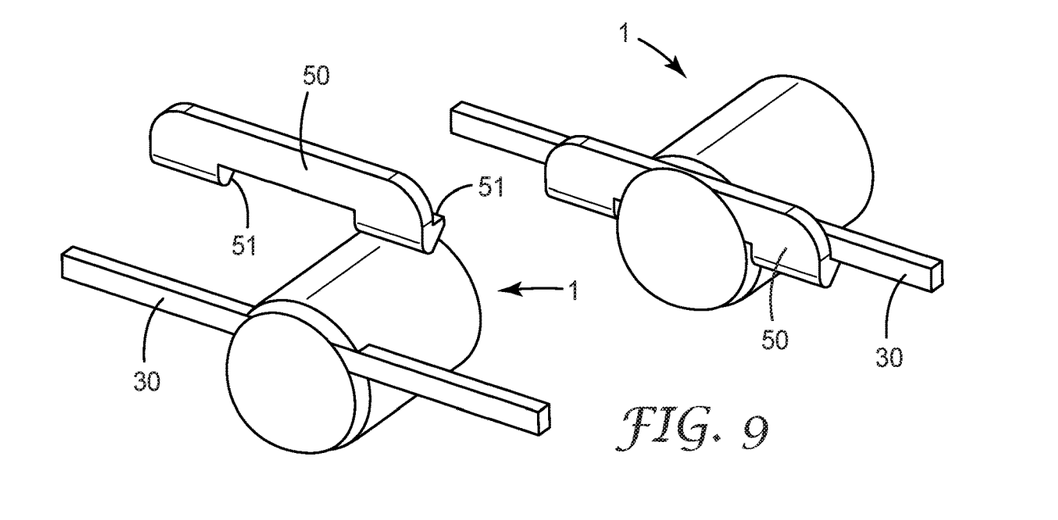
FIG. 9 is a perspective view of a further orthodontic bracket according to an embodiment of the invention.

FIG. 9 shows a further exemplary orthodontic bracket 1 according to the invention in which an archwire 30 is mounted. An alternative orthodontic ligature 50 is provided, which has retention structures 51 for retaining the orthodontic ligature 50 at the archwire 30 (instead of at the orthodontic bracket). On the left of FIG. 9 the orthodontic ligature is not yet mounted to the archwire 30 and on the right of FIG. 9 the orthodontic ligature is retained at the archwire 30.

What is claimed is:

1. An orthodontic appliance comprising: an orthodontic bracket including a tooth facing surface for bonding the orthodontic bracket to a patient's tooth and a slot for receiving an archwire, the slot extending through the orthodontic bracket along an archwire axis, wherein the slot is delimited in directions radially of the archwire axis by a slot base surface and an opposite slot cover surface and two opposite slot side surfaces, wherein the cover surface is on the opposite side of the slot from the tooth facing surface, wherein the slot has an open side that is provided by a gap between one of the slot side surfaces and the slot cover surface, and an orthodontic archwire for running through the slot of the orthodontic bracket and an orthodontic ligature, wherein at least a portion of the orthodontic ligature is arranged within the slot between the orthodontic archwire and the cover surface, thus trapping the orthodontic archwire between archwire between the two slot side surfaces, the slot base surface and the at least portion of the orthodontic ligature such that the archwire is tooth held between the tooth facing surface and the ligature.

2. The orthodontic bracket of claim 1, wherein the slot base surface and the two slot side surfaces are planar, and wherein the two slot side surfaces are parallel relative to each other and perpendicular to the slot base surface.

3. The orthodontic bracket of claim 1, wherein the gap has a gap width in a dimension perpendicular to the archwire axis and wherein the slot has a slot width between the slot base surface and the slot cover surface in the same dimension, and wherein the slot width is twice of the gap width or smaller.

4. The orthodontic bracket of claim 1, wherein the gap is located at an occlusal surface of the bracket.

5. The orthodontic bracket of claim 1, wherein the tooth facing surface has a shape that is customized with respect to the shape of the patient's tooth.

6. The orthodontic bracket of claim 1, wherein the orthodontic bracket is a lingual orthodontic bracket.

7. The orthodontic bracket of claim 1, wherein the orthodontic bracket has a base portion forming the tooth facing surface, a cap portion forming an end surface of the orthodontic bracket on an opposite side of the tooth facing surface, and wherein the orthodontic bracket has an intermediate portion connecting the cap portion and the base portion.

8. The orthodontic bracket of claim 7, wherein the cap of the orthodontic bracket exhibits a ball-shaped outer surface.

9. The orthodontic bracket of claim 7, wherein the intermediate portion forms a constriction for retaining an orthodontic ligature therein.

10. The orthodontic appliance of claim 1, wherein the appliance further defines a vestibular-lingual axis perpendicular to the archwire axis and a tooth axis perpendicular to the vestibular-lingual axis, and wherein the gap is open along the tooth axis.

11. The orthodontic appliance of claim 1, wherein the orthodontic ligature is retained at the orthodontic bracket and thereby the portion of the orthodontic ligature is locked within the slot.

12. The orthodontic appliance of claim 11, wherein the orthodontic ligature has a retention structure for engaging with a retention structure at the orthodontic bracket.

13. The orthodontic appliance of claim 11, wherein the orthodontic ligature has a retention structure for engaging with the archwire.

14. The orthodontic appliance of claim 1, comprising a plurality of orthodontic brackets and an orthodontic ligature for each of the orthodontic brackets.

* * * * *